United States Patent
Wong

(10) Patent No.: US 9,453,130 B2
(45) Date of Patent: Sep. 27, 2016

(54) PYROLYTIC OIL FOR THE MANUFACTURING OF CARBON BLACK

(71) Applicant: Wing-Yam Wong, Dunrobin (CA)

(72) Inventor: Wing-Yam Wong, Dunrobin (CA)

(*) Notice: Subject to any disclaimer, the term of this patent is extended or adjusted under 35 U.S.C. 154(b) by 33 days.

(21) Appl. No.: 14/401,829

(22) PCT Filed: May 14, 2013

(86) PCT No.: PCT/CA2013/000478
§ 371 (c)(1),
(2) Date: Nov. 17, 2014

(87) PCT Pub. No.: WO2013/170358
PCT Pub. Date: Nov. 21, 2013

(65) Prior Publication Data
US 2015/0125381 A1    May 7, 2015

Related U.S. Application Data

(60) Provisional application No. 61/648,143, filed on May 17, 2012.

(51) Int. Cl.
*C09C 1/48*     (2006.01)
*C09C 1/50*     (2006.01)

(52) U.S. Cl.
CPC .................. *C09C 1/482* (2013.01); *C09C 1/48* (2013.01); *C01P 2006/80* (2013.01); *C09C 1/50* (2013.01)

(58) Field of Classification Search
CPC .................................................... C09C 1/482
See application file for complete search history.

(56) References Cited

U.S. PATENT DOCUMENTS 4,171,345 A * 10/1979 Toshev ............... C09C 1/482
                                                              423/449.7
2002/0072640 A1    6/2002 Nichols et al.

FOREIGN PATENT DOCUMENTS

| CA | 1114764    | 12/1981 |
| CA | 2255211 A1 | 6/1999  |
| CA | 2268675 A1 | 10/1999 |
| EP | 0 928 817 A1 | 7/1999 |

OTHER PUBLICATIONS

Extended European Search Report issued on Dec. 18, 2015, regarding EP 13 79 1227.
International Search Report issued on Aug. 16, 2013, regarding PCT/CA2013/000478.

* cited by examiner

*Primary Examiner* — Stuart Hendrickson
(74) *Attorney, Agent, or Firm* — DLA Piper LLP (US)

(57) ABSTRACT

An integrated scrap tire pyrolysis plant can be built to process scrap tires. The recovered carbon black can be used in rubber and plastic industries. Oil and gas from the pyrolysis process can further be used in the production of virgin carbon black. Natural rubber is a sustainable feedstock for the manufacture of tires, making the manufacture of virgin carbon black partially sustainable. A very low PAH carbon black can be produced by limiting the exit temperature of carbon black and tail gas prior to leaving the reaction chamber.

12 Claims, 2 Drawing Sheets

PYROLYTIC OIL FOR THE MANUFACTURING OF CARBON BLACK

CROSS-REFERENCE TO RELATED APPLICATIONS

This application is a 35 USC §371 National Stage application of International Application No. PCT/CA2013/000478 filed May 14, 2013; which claims the benefit under 35 USC §119(e) to U.S. Application Ser. No. 61/648,143 filed May 17, 2012. The disclosure of each of the prior applications is considered part of and is incorporated by reference in the disclosure of this application.

TECHNICAL FIELD

The present application pertains to the field of carbon black. More specifically, the present application relates to the use of reclaimed pyrolytic oil in the manufacture of virgin carbon black.

BACKGROUND

Carbon black is used as a filler, pigment and/or reinforcing material in polymer composites, for example, in rubbers and in plastic masterbatches. Manufacturers require consistent quality and consistency in the carbon black. According to MaRS Market Intelligence Report Research in September 2011, worldwide carbon black consumption at that time was 9 million tonnes p.a., expected to reach 13 million by 2015. Average global growth will likely exceed 4% over the next five years. Ninety percent of the carbon black is used in the tire and rubber manufacturing sector.

According to a DATAMONITOR report on global tire and rubber publication in June 2011, the global tires and rubber market grew by 9.2% in 2010 to reach a value of $124.7 billion. $111 billion of that is in the tire market. In 2015, the global tires and rubber market is forecasted to have a value of $171.9 billion, an increase of 37.9% since 2010.

As the continuing accumulation of scrap tires has become a major global environmental hazard, there has been an increased focus on processes and methods for reclaiming the components of scrap rubber, including tire rubber. The materials reclaimed from rubbers are pyrolytic oil (pOIL), pyrolytic carbon black (pCB), non condensable gas and steel through pyrolysis process.

Scrap tires come from two sources: Post Consumer Scrap and Post Industrial Scrap, which is waste, defective parts or by-products. Scrap tires are composed of polymer composites, the thermal decomposition of the polymer composites (primarily natural rubber and styrene butadiene rubber) in an inert environment produces pyrolytic oil (pOIL), pyrolytic carbon black (pCB), non condensable gas and steel. Natural rubber coming from latex is mostly polymerised isoprene, thus pOIL can be considered as a partially sustainable oil. Presently the feedstock oil and fuel for making carbon black are all fossil fuel base.

The main feedstock for the production of virgin carbon black is fossil fuel. Although there are many trials in recycling of tire either by crumbing or by pyrolysis to reuse carbon black, these are not widely practiced due to quality issues. Some examples include the U.S. Pat. No. 7,329,329, U.S. Pat. No. 7,922,830, U.S. Pat. No. 6,221,329, U.S. Pat. No. 5,720,232, U.S. Pat. No. 6,835,861, U.S. Pat. No. 6,833,485, U.S. Pat. No. 5,037,628, US Patent Publication No. 2008/0286192, WO 99/08849, and WO 2006/119594.

Despite prior efforts to commercialize pyrolysis technology, it has not yet been achieved in an economically viable way. Although many pyrolysis projects have been proposed, patented, or built over the past decade, none have been commercially successful. Many of these processes are not truly continuous, but are, in at least some aspects or steps, limited to batch processing techniques. As such, they suffer from not being sufficiently scalable to be commercially viable. Others require excessive energy inputs to produce recycled/reclaimed material of sufficiently high quality to permit use in commercial products, with the result that they are not economical. In particular, the products of batch-type tire pyrolysis have limited marketability due to the low quality of their end products as compared to virgin materials. For instance, pyrolytic oil (pOIL) typically contains a mix of low volatile and heavy aromatic contents hydrocarbons. Moreover, with batch pyrolysis techniques, the consistency of the end products may vary with each run. As such, the resulting pOIL cannot be used for direct heating, or used as a direct feedstock in the petrol chemical industries. As a result, much of the pOIL, arising from existing pyrolysis processes, is used as recycled oil or used for blending in the fuel industry.

Polycyclic aromatic hydrocarbons ("PAHs") are a large group of organic compounds having at least two fused aromatic rings. Examples of PAHs include naphthalene, anthracene, pyrene, benzofluoranthenes, benzopyrenes, etc. Many PAHs are known to be carcinogenic, mutagenic and/or teratogenic. The following Table 1 shows sixteen key PAHs and their boiling points.

TABLE 1

| PAH and Boiling Point | |
|---|---|
| PAH | Boiling Point deg C. |
| Anthracene | 342 |
| Acenaphthene | 96.2 |
| Acenaphthylene | 275 |
| benz(a)anthracene | 400 |
| benzo(a)pyrene | 360 |
| benzo(b)fluoranthene | no data |
| benzo(ghi)perylene | 550 |
| benzo(k)fluoranthene | 480 |
| Chrysene | 448 |
| dibenz(a,h)anthracene | 524 |
| Fluoranthene | 375 |
| Fluorine | 375 |
| indeno(1,2,3-cd)pyrene | 530 |
| Naphthalene | 218 |
| Phenanthrene | 340 |
| Pyrene | 404 |

PAHs are formed as a result of pyrolytic processes. Not surprisingly, PAHs are formed during the pyrolysis of organic materials such as coal and crude oil and during pyrolysis of rubber and other polymer composites. As a result, both virgin and reclaimed pyrolytic carbon blacks generally include relatively high levels of PAHs. Given the negative health and environmental effects from PAHs, there is increased public and regulatory pressure to reduce PAH levels in carbon blacks, particularly carbon blacks destined for use in the manufacture of plastic materials and articles intended to come into contact with foodstuffs.

A need remains for a pCB that can be reliably incorporated in commercial products, such as polymer composites, as a total or partial replacement for the virgin carbon black presently used in these products. Further, there remains a need for a pCB that has low PAH levels and that can be reliably incorporated in commercial products.

This background information is provided for the purpose of making known information believed by the applicant to be of possible relevance to the present invention. No admission is necessarily intended, nor should be construed, that any of the preceding information constitutes prior art against the present invention.

SUMMARY

The present application discloses the use of pyrolytic oil (pOIL), as a feedstock for the production of virgin carbon black (vCB). The pOIL has a very high percentage of aromatic contents and specific characteristics that that make it suitable for the production of vCB.

Additionally, because tire composite is made up with natural and synthetic rubber with the following compositions (according to the Rubber Manufacturing Association) in weight: passenger tire (natural rubber: 14% and synthetic rubber: 27%) and truck tire (natural rubber: 27% and synthetic rubber: 14%), the pOIL from tire composite is a partially sustainable oil coming from the natural rubber.

In another aspect, there is disclosed the use tire derived pyrolytic oil to produce low PAH carbon black.

In accordance with an aspect of the present application, there is provided a vCB derived from pOIL wherein the vCB has low volatile content with a toluene transmission of over 90% (ASTM D1618) and the vCB comprises less than about 10 µg/g of polycyclic aromatic hydrocarbons (PAH).

By weight, tires from passenger cars and light trucks account for about 84 percent of the waste tires generated. Heavy-truck and bus tires compose 15 percent of the scrap tires produced, while heavy equipment, off-road, and airplane tires make up the remaining 1 percent. On the average, passenger tires weigh 25 pounds new and 20 pounds when scrapped; truck and bus tires weigh 120 pounds new and 100 pounds when scrapped. In one embodiment, the polymer composite is a rubber composite, the tire composite is made up with natural and synthetic rubber with the following compositions in weight: passenger tire (natural rubber: synthetic rubber is 14 to 27% 1) and truck tire (natural rubber: synthetic rubber is 27 to 14%). These rubbers are pyrolysed to produce hydrocarbon gases under normal temperature and pressure, the condensable gases becomes the pyrolytic oil.

In accordance with another aspect of the application, the tire comprises primarily polymers such as natural rubber (NR) and styrene butadiene rubber (SBR) where NR is a sustainable feed stock. Natural rubber, also called India Rubber or caoutchouc, is an elastomer (an elastic hydrocarbon polymer) that was originally derived from latex, a milky colloid produced by some plants. Thus pOIL is a partially sustainable oil.

In accordance with another aspect of the application, a tire pyrolysis plant can produce two carbon black products: pCB from the tire pyrolysis process and the pOIL is used to produce vCB with a very low volatile content.

Having an integrated scrap tire plant which produces all the recovered materials: namely, pCB, pOIL, non condensable gas from the pOIL, and steel and using pOIL to manufacture vCB will help tire and carbon black manufacturers to further move into green product stewardship and reduce the overall carbon footprint in the manufacture of tires, rubber manufacturing products and carbon black.

DETAILED DESCRIPTION

Figure 1:
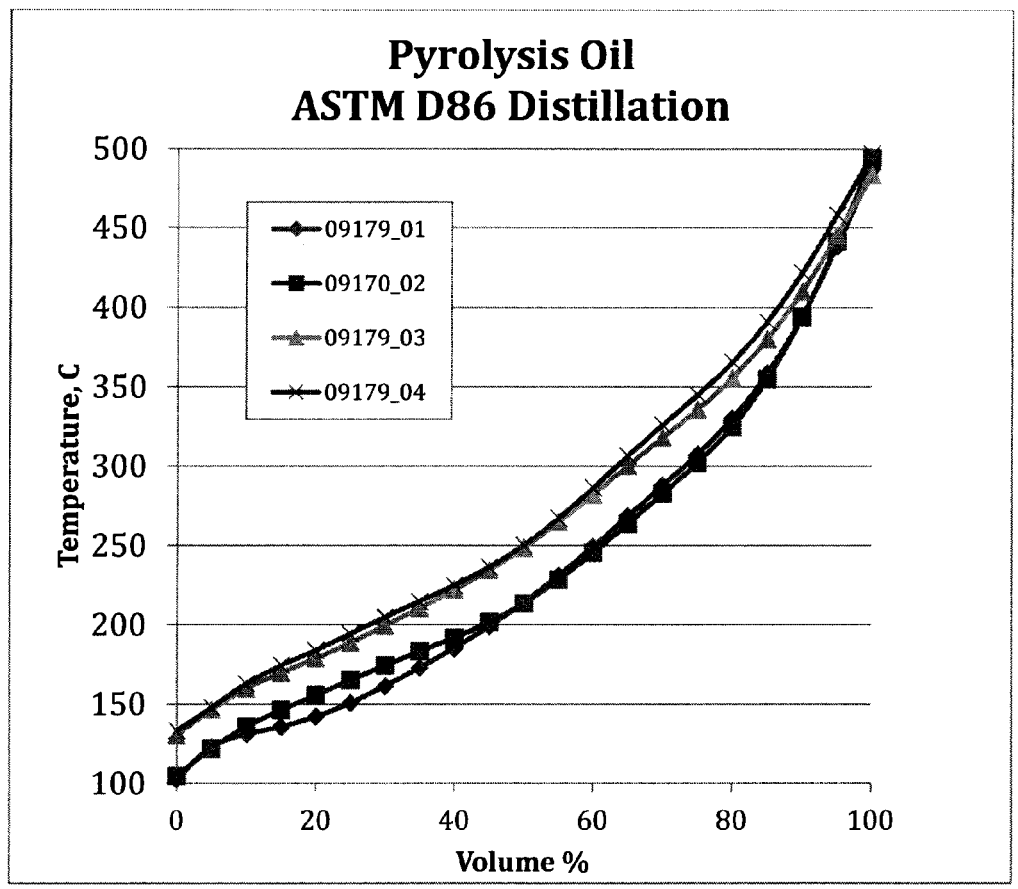
FIG. 1 is graph of the pyrolysed tire oils (pOIL) distillation curves.

It is to be understood that both the foregoing description and the following description are exemplary and explanatory only and are intended to provide a further explanation of the present invention or claimed.

Unless defined otherwise, all technical and scientific terms used herein have the same meaning as commonly understood by one of ordinary skill in the art to which this disclosure belongs.

As used herein, the singular forms "a", "an" and "the" include plural references unless the context clearly dictates otherwise.

The term "comprising" as used herein will be understood to mean that the list following is non-exhaustive and may or may not include any other additional suitable items, for example one or more further feature(s), component(s) and/or ingredient(s) as appropriate.

"Carbon black" is virtually pure elemental carbon in the form of colloidal particles that are typically produced by incomplete combustion or thermal decomposition of gaseous or liquid hydrocarbons under controlled conditions.

The terms "virgin carbon black", "furnace carbon black" and "vCB" as used herein refer to carbon black made from fossil fuels.

"Pyrolytic oil" or "pOIL" is oil derived from pyrolysis process.

"pCB" is carbon black recovered from tire pyrolysis process.

"pGAS" is gas produced from the pyrolysis process.

The terms "commercial carbon black" is used herein to refer to carbon black made from unrecycled fossil fuel.

The feedstocks for the production of virgin carbon black are air, oil, gas and additive, if required. The furnace black process prefers heavy aromatic oil. The heart of the process in the carbon black production unit is the reactor. The initial product of the unit is a mixture of process gas and carbon black suspended in the form of an aerosol. This aerosol is cooled and directed into collection systems where the carbon black and the process gas (tail gas) are separated. The collected vCB is then separated from the tail gas by passing through a hot cyclone and electrostatic precipitator. The fluffy annealed vCB is then densified to pellets. The annealed carbon black produced by this process has a very low PAH content.

For a better understanding of the present invention, as well as other aspects and further features thereof, the following describes some key characteristics of the pOIL.

A detailed characterization study of the pOIL was performed using Gas Chromatography—Mass Spectrometry. The sample is highly aromatic. The major compounds that can be identified are benzene, toluene and other aromatics. There are also olefins, diolefins and cyclic olefins present in the more volatile portion of the chromatograms. Other compounds identified include sulphur, nitrogen and oxygen containing PAH. The pOILs in the sample can be separated into two ranges, lighter and heavier. Characteristics of those two ranges follow.

Lighter Range:
  benzene, toluene, ethylbenzene, xylenes and styrene are the most abundant compounds identified in the gasoline range
  the majority of the others in this range are substituted benzenes cyclic and linear olefins are found in the lightest portion of this range other compounds found in this range are thiophenes, benzonitriles and possibly a small amount of oxygenated aromatics Heavier Range:

polycyclic aromatic hydrocarbons (PAH), ranging from two to four rings, make up the majority of the remaining compounds identified in this report the most abundant compounds indentified in this range include naphthalene and substituted naphthalenes and substituted indenes other compounds include biphenyl and substituted biphenyls, higher molecular weight PAH and their alkyl substituted analogs also found to a lesser extent are sulphur PAH (including benzothiophenes and dibenzothiophenes), benzothiazole.

The oil sample analysed had a total sulphur content (ASTM 1552) 1.18% wt, Specific Gravity (ASTM 4052) 981.4 kg/m$^3$, Viscosity (ASTM 445) 2.63 (CST), Heat of Combustion 42 MJ/kg FIG. 1 is an example of the pyrolysed tire oils (pOIL) distillation curves which give BUREAU OF MINES CORRELATION INDEX (BMCI) of about 100.

The pGAS is typically composed of: Hydrogen, methane, carbon dioxide (trace), oxygen (trace), moisture (trace), C2, C3, C4, C5, C6, and nitrogen with a heat content of about 600 btu/scf.

There are various patents granted related to tire pyrolysis with the recovery of carbon black, oil, gas and steel. U.S. Patent publication No. 2011/0200518 discloses a process for producing a reclaimed pyrolyzed carbon black (pCB) from rubber composites, such as tire rubber.

The present application proposes to use pOIL to produce vCB, by applying a specific process technique. The vCB from tire derived pOIL can be produced with very low PAH content. The pOIL can be used for the production of vCB in the furnace black process. Those who are in the art of vCB production will know how to produce vCB with different specifications. For example, U.S. Pat. No. 5,593,644, U.S. Pat. No. 4,339,422 disclose how to produce high quality carbon black. However, neither of these patents address the issue of producing low PAH vCB.

pOIL containing large amount of aromatic hydrocarbon is an ideal feedstock for the production of vCB. U.S. Pat. No. 4,527,069 describes aromaticity by reference with BMCI (BEREAU OF MINES CORRLATION INDEX)

$$BMCI = 48,640/K + 473.7G - 456.8$$

K=Average boiling point, deg K
G=Specific Gravity @ 60 deg F

Carbon black structure: Individual carbon black aggregates occur in what appears to be random constructions of randomly sized particles, but when dealing with aggregates, enormous numbers are involved and it is the mean effect of all these individual entities that must be controlled.

The morphology of aggregates is just as complex as that of particles. Aggregate sizes can vary as can the distribution of those sizes. They can occur as semi-spherical groupings of particles or they can occur as groupings with a distinctly long dimension. Aggregates can be very dense, solid construction or of an open lattice-like configuration. This last parameter can be termed aggregate density and will have a direct bearing upon aggregate count per unit mass. Aggregate count can be envisioned as a primary factor in many of the observed changes in rubber compounds with changes in carbon black morphology. As the count per unit mass increases, aggregate interstitial spacing is reduced, which affects the mobility of that portion of elastomer that bridges the space. Again, convenient methods for distinguishing between many of these aggregate characteristics have not as yet been devised.

In general, those properties of aggregates, which are independent of particle size, have been lumped into the term "structure." For a high structure, these would include the propensity of aggregates to have a higher particles counts and for particles to be joined into more chain-like clusters, having a narrow core. The cores can include random branching.

High aromatic oil favours the manufacture of high structure carbon black and low aromatic oil favours low structure black. Typically a BMCI of 60 to 100 is good for low structure black and 100-130 is good for high structure black. The pOIL as described has a BMCI of about 100 based on an average boiling point temp of from 130 to 560 deg C and an average specific gravity of 0.985.

The initiation step in CB production is the pyrolysis of the pOIL according to an embodiment of the present application. Pyrolysis does not have a reactive step. The followings are the typical reactions in vCB product.

Gasification reactions for the formation of carbonaceous carbon:

| | | |
|---|---|---|
| 1. | $C + CO_2 = 2CO$ | $\Delta H° = +172$ kJ2. |
| 2. | $C + H_2O$ (g) $= CO + H_2$ | $\Delta H° = +130$ kJ |
| 3. | $C + 2H_2O$ (g) $= CO_2 + 2H_2$ | $\Delta H° = +88$ kJ |
| 4. | $C + 2H_2 = CH_4$ | $\Delta H° = -71$ kJ |
| 5. | $CO + H_2O$ (g) $= CO_2 + H_2$ | $\Delta H° = -42$ kJ |
| 6. | $CO + 3H_2 = CH_4 + H_2O$ (g) | $\Delta H° = -205$ kJ |
| 7. | $C + \frac{1}{2}O_2 = CO$ | $\Delta H° = -109$ kJ |
| 8. | $C + O_2 = CO_2$ | $\Delta H° = -390$ kJ |

$\Delta H°$ is the enthalpy of reaction for 1 mole of the pure substance, at a temperature of 298° C., and a pressure = 0.1 MPa (1 atmosphere).

The energy required to drive reactions 1-3 is commonly provided through partial oxidation, as shown in equations 7 and 8. The high rates of heat transfer achievable during the partial oxidation process within the gasifier are such that this process is often considered an autothermal method of gasification. Often, between 20 and 30 percent of the feed mass flow is consumed to provide the energy needed to pyrolyze the feed and complete the gasification of the pyrolytic products.

The oxygen requirement for the partial oxidation process can be supplied by air, oxygen-enriched air, or pure oxygen at a range of different pressures. The reaction of the feedstock and other gaseous products with hydrogen can also provide energy for continuing these reactions, as shown in equations 4 and 6, by using hydrogen-driven gasification, or hydrogasification, based on the methanation reaction shown as equation 4 above. This is an exothermic reaction, and can be used to sustain gasification temperatures. In addition, the exothermic reactions of carbon monoxide, (equations 5 and 6) in the presence of steam and hydrogen can provide enough additional energy to sustain the gasification of the activated carbon char without the need for partial oxidation.

Embodiments of the present disclosure, present invention produce vCB using pOIL as feedstock. The vCB produced comprises less than about 20 µg/g of polycyclic aromatic hydrocarbons (PAH) or, preferably, less than about 10 µg/g of PAH. In certain embodiments, the concentration of PAH in the vCB is 5 µg/g or less. These levels of PAH are, in fact, lower than those found in most virgin carbon blacks. It has been found that low PAH levels carbon black can be used successfully in the manufacture of polymer composites without compromising, or without significantly compromising the properties (e.g., mechanical and rheometric properties) of the polymer composites.

As described herein, the low PAH levels are determined based on the total concentration of the following sixteen PAHs: naphthalene, acenaphthylene, acenaphthene, fluorene, phenanthrene, anthracene, fluoranthene, pyrene, benzo(a)anthracene, chrysene, benzo(b)fluoranthene, benzo(k)fluoranthene, benzo(a)pyrene, indeno (1,2,3-cd) pyrene, dibenz(a,h)anthracene and benzo(ghi)perylene. The vCB can contain additional PAHs, however, based on the toluene discolouration test, these will also be present at very low concentrations such that they will not significantly affect the total PAH concentration in the vCB. However, it should be understood that when referring to the total PAH amounts in the vCB as disclosed herein, the specific PAH amounts recited relate only to the totals obtained from measuring the amount of the above sixteen PAHs.

Examples of commercial carbon black that can be replaced by the present vCB include, but are not limited to ASTM specification carbon black, such as, but not limited to, a N110, N121, N125, N220, N231, N234, N242, N293, N299, N326, N330, N339, N347, N351, N358, N375, N539, N550, N630, N650, N660, N683, N762, N765, N774, N787, and/or N990 carbon black.

Figure 2:
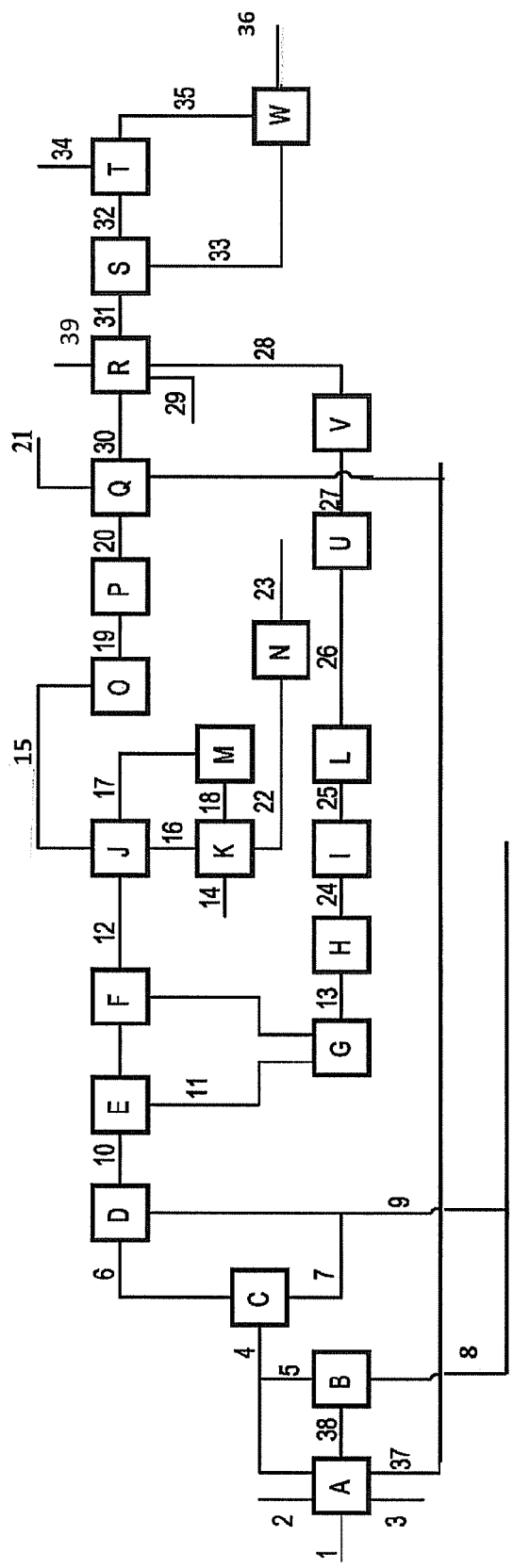
FIG. 2 is a diagram of the the overall process flow of the integrated tire pyrolysis and carbon black manufacturing.

Tire Pyrolysis:

FIG. 2 is an overall process flow which will be used to describe an embodiment the processes described herein. Tire shreds from line (1) are introduced to a calciner (A), which is a pyrolysis reactor where shreds are subjected to indirect heating with the absence of oxygen. Thermal decomposition takes place with the release of gaseous components and some entrainment of carbon particles, these take off from line (4) to a hot cyclone (C), which separates the gaseous components and the carbon particles. Line (37) is a pyro gas feed to the burner for the calciner and line (2) is the burner exhaust vent. Hot pCB, steel and some fibreous materials enter a cooler (B) via line (38). Temperature of these materials are lowered by indirect cooling with water and go to the beneficiation of the pCB via line (8). Very small amounts of gaseous components will also be emitted from the cooler and leave via line (5) to the cyclone (C). The pCB from the hot cyclone (C) leaves via line (7) to pCB beneficiation processes. Hot pGAS leaving the cyclone (C) via line (6) goes to a duplex hot oil filter (D) to ensure particulates are removed. The collected particulates from the filter (D) join the beneficiation process via line (9). Via line (10), the particulate free hot pGAS enters a first primary water condenser (E) and then a secondary water condenser (F) where the hot pGAS is separated into pOIL and cooled non-condensable pGAS.

The condensation method as described above is a relatively simple method of producing pOIL. In another embodiment the gaseous components are condensed in a packed column. By condensing the gaseous components in a packed column, a higher BMCI index pOIL can be achieved by controlling the flow rate of the condensed cooled oil in the return spray and the depth of the packed bed. Thus the temperature of the gas leaving the tower can be controlled and the BMCI value of the pOIL can be varied.

The condensed pOIL leaves line (11) and is collected in a pOIL storage tank (G). The pGAS exits line (12) and enters into a wet scrubber (J). Make up sodium hydroxide solution from line (14) feeds into a wet scrubber reservoir (K). Spent waste scrubber solution is pumped by a pump (N) via line (22) and exits through line (23) to a waste water treatment system. Recirculated scrubber solution is pumped by a pump (M) via line (18) and discharged via line (17) back to the scrubber (J) for gas stripping. Scrubbed pGAS is vented by a fan (O) via line (15) and then compressed by a compressor (P) via line (19) and into a gas storage tank (Q) via line (20). Line (21) is a pGAS supply to a pellet dryer after milling.

Carbon Black Process

Carbon black can be ranked as being one of the oldest manufactured products. Furnace black process is the most popular process. Many patents were awarded to companies and inventors. A few examples of granted patents are: U.S. Pat. Nos. 3,010,790, 1,438,032, 2,564,700, 3,490,869, 3,922,335, 3,256,065 and 4,540,560. Subsequently, many improvement patents of how to make carbon black or specific types of carbon blacks were granted based on some of the early patents. Conventional techniques that are well known to those skilled in the art can be used to manufacture vCB. The feed raw materials are oil, gas, air and additives (e.g. potassium chloride). Natural gas is the most frequently used raw material among the gaseous hydrocarbon. Oil containing high aromatic content is particularly advantageous in terms of product yield. The feedstock has to be vaporised and the boiling point of the feedstock oil must not be too high. All feedstock is preheated through heat exchangers prior to combustion and reaction to produce vCB. Those who are skilled in the art will know that apart from the gas being used as a fuel for raising the temperature, some of the oil will also be consumed rather than converted to vCB. As a rough approximation, 1 kg of oil will yield about 0.7 kg of vCB. However, oil aromaticity affects vCB yield. The resultant tail gas from vCB manufacturing is high in energy content. A modern carbon black plant is capable of generating approximately three times the amount of electricity it consumes, the excess being sold to the local distribution electricity companies.

In FIG. 2, preheated pGAS from line (30) and air from line (29) enter a CB reaction chamber (R), pOIL is pumped by a pump (H) from the condenser oil tank (G) via line (24) through a duplex filter (I) to a oil storage tank (L) via line (25). From line (26), pOIL is delivered by a pump (U) through a duplex oil filter (V) via line 27 and finally delivered via line 28, preheated and injected to the reaction chamber (R) down stream from the pOIL/air combustion zone inside the reactor. vCB is formed inside the reaction zone and moving towards the exit of the reaction chamber, prior to the exit, at line (39), quench water with low dissolved solid content (below 100 ppm) is used to stop the reaction and lower the temperature of the exit off-gas and vCB. The amount of quench water used is controlled so that the temperature of the mixture is kept above 600 deg C but below 800 deg C. This range of temperature assists in achieving a vCB with a low PAH of about 5 ug/gm. This mixture exits via line (31) and enters a hot cyclone (S) for vCB separation. Smaller size vCB and tail gas exits the top of the cyclone (S), through line (32) and enters an electrostatic precipitator (T). vCB is collected through line (33) and line (35) into a vCB storage tank (W). Tail gas exits via line (34) and the vCB from the storage tank (W) leaves to the pelletizing process via line (36). To ensure that the higher boiling point PAHs will not be condensed, the amount of PAHs in the separation of the vCB and the tail gas is controlled. One way to achieve this is to ensure the temperature when separating these mixtures will be below 600 deg C. Alternatively the PAH level can be controlled post manufacturing by either reheating the carbon black in a chamber to the temperature required to boil off the PAHs or using a solvent to extract the PAHS. However, reheating and solvent extraction require an extra unit of operation over controlling temperature during the separation of the mixtures.

The vCB pellets can be prepared using standard techniques of wet pelletization, including surfactant-assisted wet pelletization or other binding agents.

In some embodiments the vCB produced has a toluene transmission of over 90%. In some embodiments the vCB produced comprises less than about 10 µg/g of polycyclic aromatic hydrocarbons (PAH). In some embodiments, the vCB produced comprises less than about 5 µg/g of (PAH). In some embodiments, the vCB produced has a sulfur content of less than about 1.5%, or about 1.5-2.0%. In some embodiments, the vCB produced has an ash content of no more than about 0.25%, or no more than about 0.5%.

EXAMPLES

Example 1 vCB/pCB Overall Yield from Tire Pyrolysis and vCB Manufacturing Using pOIL

This example assumes a 20,000 M ton capacity tire pyrolysis plant per annum which equates to approximately 2 million passenger equivalent scrap tires. The plant is run under the following operating conditions and yield.

| Temperature deg C. | Pressure kPa | Solid (wt. %) | Liquid (wt. %) | Gas (wt. %) | Steel (wt %) | Others (wt. %) |
|---|---|---|---|---|---|---|
| 450-600 | 101 | 35 | 45 | 20 | 10 | 1 |

The following tabulates the product yield.

| Feed M ton | pCB M ton | vCB M ton | pGAS M ton | Steel M ton |
|---|---|---|---|---|
| 20,000 | 6230 | 5607 | 3560 | 2000 |

Thus, for a 10 kg passenger equivalent scrape tire, 3.02 kg (pCB), 2.80 kg (vCB), 1.78 kg (pGAS) and 2.00 kg (steel) can be produced.

Notice the vCB amount is lower as some of the pOIL is consumed in the reaction. The pGAS is used for running the pyrolysis process, pellet dryer and provide fuel for the vCB process. Tail gas from the vCB process can be used for power generation.

Example 2

Polycyclic Aromatic Hydrocarbon (PAH) Content and Toluene Extraction Analysis

As described above, PAHs are toxic and known for their carcinogenic, mutagenic and teratogenic properties. The U.S. EPA has designated 32 PAHs as priority pollutants. Moreover, they are highly regulated by R.E.A.C.H. (Registration, Evaluation, Authorization and Restriction of Chemicals) in the EU, TSCA (Toxic Substance Control Act) in the U.S. and DSL/NDSL (Domestic Substances List/Non Domestic Substance's List) in Canada.
Transmittance of Toluene Extract The purpose of this test is to provide an estimate of the toluene-soluble discolouring residues, namely PAHs, present in the samples. Sample of the first batch of vCB and commercial CB were analyzed according to ASTM D1618-99 (reapproved 2004).
Analysis of Toluene Extracts to Quantify PAH Amounts Toluene extracts obtained from the tests performed above according to ASTM D1618-99 were analyzed by GC-MS to determine the amount of common PAHs in the commercial CB and vCB batch.

TABLE 2

PAH Content/Toluene Extract Analysis of Commercial CB and vCB

| Test | Commercial CB-N234 | Commercial CB-660 | vCB |
|---|---|---|---|
| Toluene Discoloration (% T) | 86.5 | 48.2 | 94.7 |
| PAH (µg/g) | 220 | 150 | 8.7 |

CONCLUSIONS

The toluene discolouration test results indicated that vCB-batch had a greater percent transmittance value (94.7%) than any of the two commercial CB samples; for example, a value of approximately 48% was recorded for N660. This indicates that there is less toluene-soluble material, which are predominantly PAHs, in the vCB than commercial CB. Further corroborating this is the analysis of the resulting extracts by GC-MS which revealed that vCB-batch had significantly lower levels of PAHs, in some cases by two orders of magnitude, than the commercial CB samples when quench water used is controlled so that the temperature of the mixture is kept and sustained above 600 deg C but below 800 deg C. This range of temperature assists in achieving a vCB with a low PAH of about 5 ug/gm.

Overall, these results indicate that the levels of PAHs are markedly lower for the vCB than for commercial CB samples.

All publications, patents and patent applications mentioned in this Specification are indicative of the level of skill of those skilled in the art to which this application pertains and are herein incorporated by reference to the same extent as if each individual publication, patent, or patent applications was specifically and individually indicated to be incorporated by reference.

The methods being thus described may be varied in many ways. In some cases, the steps in the processes can be performed in a different order. In some embodiments one or more steps can be omitted. In some cases, different embodiments can be combined and steps from one embodiment can be implemented in another embodiment.

The invention claimed is:

1. A method of producing virgin carbon black with low residual polycyclic aromatic hydrocarbon (PAH) component, the method comprising the following steps:
    receiving tire shreds for processing;
    thermally decomposing the tire shreds through heat application generating a decomposed matter;
    separating the decomposed matter into gaseous and other components generating subcomponents of the gaseous and other components;
    separating the subcomponents of the gaseous and other components;
    condensing the gaseous subcomponents at a temperature range of 600 to 800 degrees Celsius, the temperature range providing the conditions to enhance separation of PAH from the gaseous subcomponents and other subcomponents; and processing further the condensed gaseous subcomponents to create virgin carbon black with low residual PAH component.

2. The method of claim 1, wherein for thermal decomposition, the heat application is applied in the absence of oxygen.

3. The method of claim 1, wherein the temperature range is controlled with the implementation of quench water.

4. The method of claim 1, wherein the temperature range is maintained for further vessels in the process in order to ensure low PAH in the subcomponents of gaseous and other components.

5. The method of claim 4, wherein the low PAH in the subcomponents of gaseous and other components is less than about 10 µg/g.

6. The method of claim 4, wherein the low PAH in the subcomponents of gaseous and other components is less than about 5 µg/g.

7. The method of claim 1, wherein the temperature in the heat application of the thermally decomposing step is kept below 600 degrees Celsius.

8. The method of claim 1, wherein the condensation is implemented by a packed column.

9. A method of producing sustainable virgin carbon black, the method comprising the following steps:

creating carbon black with an initial fuel source using a pyrolysis process comprising the following steps:

receiving tire shreds for processing;

thermally decomposing the tire shreds through heat application generating a decomposed matter;

separating the decomposed matter into gaseous and other components generating subcomponents of gaseous and other components;

separating the subcomponents of the gaseous and other components;

condensing the subcomponents of the gaseous subcomponents at a temperature range of 600 to 800 degrees Celsius, the temperature range providing the conditions to enhance separation of PAH from the gaseous subcomponents and other subcomponents; and processing further the condensed gaseous subcomponents to create virgin carbon black, pyrolytic oil, and other products;

retrieving the pyrolytic oil created from the carbon black pyrolysis process; and applying the pyrolytic oil to the initial step of creating carbon black to reduce the initial fuel source.

10. The method of claim 9, wherein the creation of virgin carbon black, pyrolytic oil, and other products are with low residual PAH components.

11. The method of claim 9, wherein for thermal decomposition, the heat application is applied in the absence of oxygen.

12. The method of claim 9, wherein the receiving tire shreds for processing is supplemented by natural rubber feedstock.

* * * * *